(No Model.)  2 Sheets—Sheet 1.
J. H. RICHFORD.
ROTARY GRAIN METER.
No. 394,938. Patented Dec. 18, 1888.
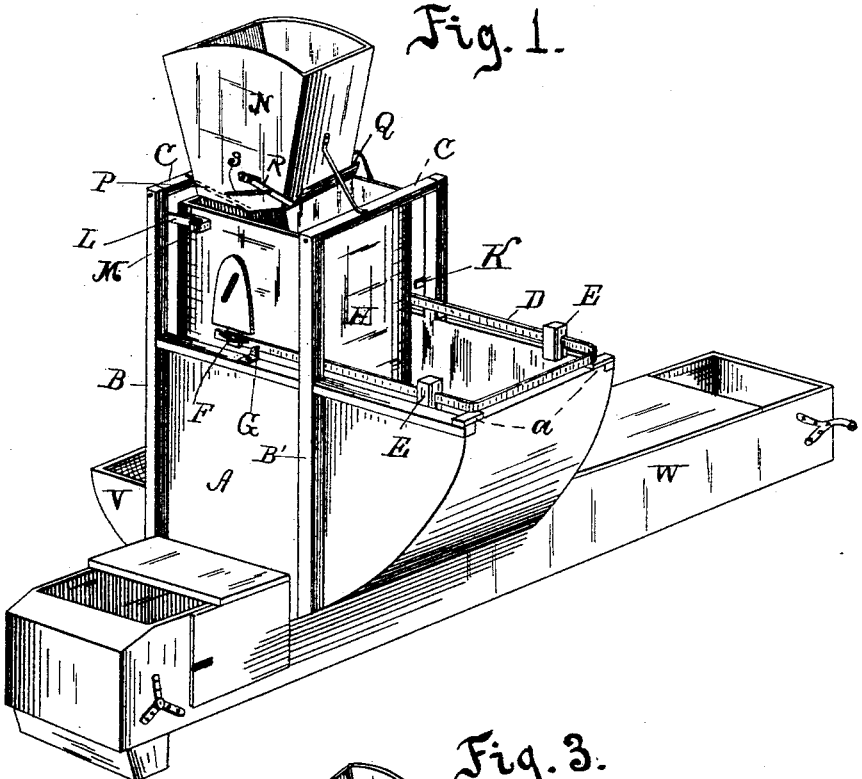
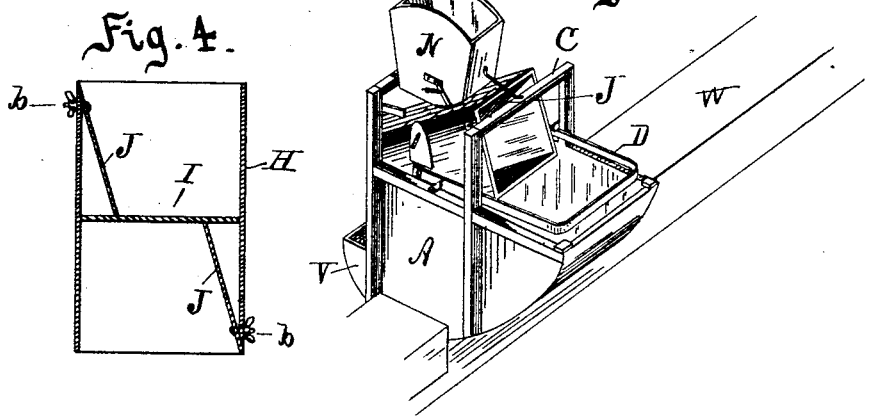
Witnesses.
Inventor.
J. H. Richford
By Stiles & Brown,
Attorneys.

(No Model.) 2 Sheets—Sheet 2.
J. H. RICHFORD.
ROTARY GRAIN METER.
No. 394,938. Patented Dec. 18, 1888.
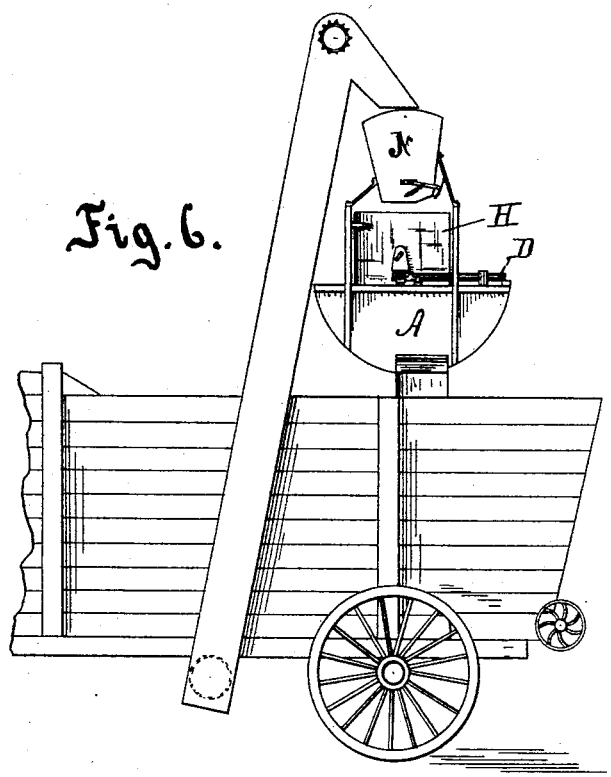
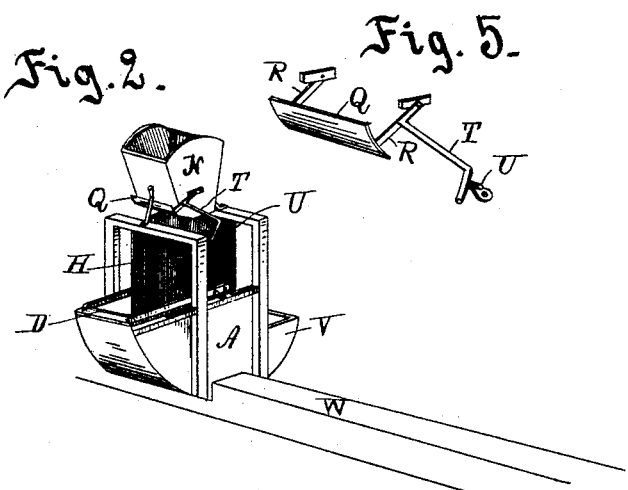
Witnesses
Inventor
J. H. Richford

UNITED STATES PATENT OFFICE.

JAMES H. RICHFORD, OF PEORIA, ILLINOIS, ASSIGNOR OF TWO-THIRDS TO FERD. LUTHY AND CHAS. T. LUTHY, OF SAME PLACE.

ROTARY GRAIN-METER.

SPECIFICATION forming part of Letters Patent No. 394,938, dated December 18, 1888.

Application filed July 25, 1888. Serial No. 281,008. (No model.)

*To all whom it may concern:*

Be it known that I, JAMES H. RICHFORD, a resident of Peoria, in the county of Peoria and State of Illinois, have invented certain new and useful Improvements in Rotary Grain-Meters; and I do hereby declare the following to be a full, clear, and exact description of the invention, such as will enable others skilled in the art to which it pertains to make and use the same.

The invention is illustrated in the accompanying drawings, in which—

Figure 1 shows the meter in perspective in position for receiving grain. Fig. 2 shows also in perspective the side opposite to that shown in Fig. 1. Fig. 3 is a view similar to Fig. 1, but with the grain-box partially revolved, as in dumping. Fig. 4 is a vertical section of the grain-box. Fig. 5 is a detail view of the hopper-valve. Fig. 6 shows the apparatus mounted upon a portion of a thrasher, with which it is often used.

In the drawings, B B' C C' is a frame supported upon a conveyer, W, and A is a trough in the form of a portion of a cylinder fixed in said frame and provided at its lowest part with an opening (not shown) leading into said conveyer. A double or divided scale-beam, D, lies just above the edges of the trough, where its two branches are supported on pivots G at corresponding points. Between these two branches swings a grain-box, H, supported by gudgeons F, fixed to the center of its opposite sides and passing through suitable apertures in the free ends of the branches of the scale-beam. The opposite end of the scale-beam rests normally upon two stops, $a$, upon the trough, in which position it is held by sliding weights E, which overbalance the empty grain-box. In this position of the beam the upper front edge of the box is slightly above the lower side of a cross-bar, C, the only part of the frame in the path of the box when rotating. Supported on the frame vertically over the box is a stationary hopper, N, provided with a swinging cut-off plate, Q R. The bottom of the hopper is downwardly inclined toward the front, and the lower front corner of the hopper is removed to form an opening. This is closed by the cut-off, whose rearwardly bent ends or arms R are pivoted to opposite sides of the hopper. A spring, S, connects the middle of one of these arms to the hopper, and tends to keep the cut-off in position to close the opening and prevent the passage of grain from the hopper to the grain-box H. The latter is rectangular and divided by a transverse partition, I, Fig. 4, into two equal compartments. From what is when either compartment is uppermost its rear upper limit a false side, J, slopes forward and downward to meet the partition I, which is preferably provided with a series of slight parallel grooves, in either of which it may rest. It is secured in position in any convenient manner, as by the bolt and wing-nut $b$, Fig. 4. The side lessens to any desired degree the capacity of the rear half of each compartment, and thus the center of gravity of the filled compartment is thrown to a variable distance in front of the line of pivotal support, causing a tendency of the box to swing forward and dump or discharge its contents. The strength of this tendency depends upon the excess of weight in the front half of the compartment and the distance of the center of gravity of the whole in front of the axis. When the parts are properly adjusted for the heavy grains, there is not rotary force enough if the box be filled with lighter grain, or particularly with grass-seed. The adjustable side, therefore, is important, as by it the precise rotary force necessary to secure the most satisfactory results is readily obtained.

If the box H be filled with grain until the weights E are overbalanced, it descends until its edge is free from the bar C, when gravity rotates it, discharging the grain and bringing the other compartment uppermost. Simultaneously with this discharge the box is again raised by the weights E, so that the bar C limits the rotation to one hundred and eighty degrees, leaving the duplicate compartment in precisely the position of the one originally at the top. Reverse rotation is prevented by hooked projections M, so placed upon the box that they have a common path. An inclined flat spring, L, is fixed upon the frame, so that its free end projects obliquely forward into this path. This is readily pushed aside by one of the advancing projections, but instantly springs into position behind the projection and prevents contrary movement. The cut-off Q is operated by somewhat similar devices. One of the arms R bears a rigid bent lever, T, which extends downward into the common path of two pins, U, upon the side of the box. As the box rotates, one of these pins pushes the lever and opens the cut-off, holding it open as long as the box is in the position; but when the box descends below the bar C it carries the pin U below the lever T, releasing it, and the cut-off is instantly closed by the spring S to be again opened by the opposite pin U, when the opposite compartment comes into position for filling.

To prevent too great motion of the scale-beam, stops K are fixed in its path to avoid the dumped grains being thrown out by its momentum. The trough is extended at V as far as may be desired.

What I claim is—

1. In a grain-meter having grain-boxes rotated about a common axis by the weight of the grain discharged into them successively, the combination, with each grain-box, of a movable side adapted to vary the internal cavity, whereby the center of gravity of the filled box may be thrown to a greater or less distance from the axis of rotation.

2. In a grain-meter, a series of grain-boxes rotating in a vertical plane about a common axis, a hopper fixed above the path of said boxes and having its lower end cut away in a cylindrical curve to form an outlet, a similarly curved cut-off closing said outlet and pivoted in the axis of the cylinder, a spring secured upon the hopper and closing said cut-off, and a rigid arm extending from said cut-off into the common path of projections upon the boxes respectively, whereby in the rotation of the boxes about their common axis the cut-off is opened by each and instantly closed when released.

3. The combination, with a suitable supporting-frame, of the divided scale-beam mounted therein, stops limiting its oscillation, grain-boxes pivotally mounted in said scale-beam and each provided with an adjustable side, J, the cross-bar C, preventing forward rotation of the empty boxes, the projections M, and spring L, preventing contrary rotation, the hopper N, and the cut-off Q, closed by a spring and opened by projections upon each of the boxes, substantially as set forth.

In testimony whereof I have signed this specification in the presence of two subscribing witnesses.

JAMES H. RICHFORD.

Witnesses:
CHARLES S. TAYLOR,
EUGENE P. BLAKE.